United States Patent
Mockford

(10) Patent No.: US 8,161,488 B2
(45) Date of Patent: Apr. 17, 2012

(54) SYSTEM AND METHOD FOR REGISTERING A SUBSCRIPTION OF INTEREST OF NEEDED NEW RESOURCE IN A STORE ACCESSIBLE BY A PLURALITY OF RESOURCE CREATORS AND PUSHING THE NEEDED RESOURCE THERETO BY THE CREATOR BASED UPON THE REGISTERED SUBSCRIPTION

(75) Inventor: Kieran P. Mockford, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1211 days.

(21) Appl. No.: 11/977,122

(22) Filed: Oct. 23, 2007

(65) Prior Publication Data

US 2009/0106765 A1    Apr. 23, 2009

(51) Int. Cl.
*G06F 9/455* (2006.01)
*G06F 9/46* (2006.01)

(52) U.S. Cl. ............. 718/104; 718/1; 718/102; 718/103

(58) Field of Classification Search .............. 718/1, 100, 718/101, 102, 103, 104, 105, 106, 107, 108
See application file for complete search history.

(56) References Cited

U.S. PATENT DOCUMENTS

| | | | |
|---|---|---|---|
| 5,671,415 A | | 9/1997 | Hossain et al. |
| 5,781,737 A | * | 7/1998 | Schmidt ........................ 709/224 |
| 6,138,158 A | * | 10/2000 | Boyle et al. ................... 709/225 |
| 6,298,476 B1 | | 10/2001 | Misheski et al. |
| 6,457,170 B1 | | 9/2002 | Boehm et al. |
| 6,654,786 B1 | * | 11/2003 | Fox et al. ....................... 709/203 |
| 6,721,740 B1 | * | 4/2004 | Skinner et al. ........................ 1/1 |
| 7,055,128 B2 | | 5/2006 | Porkka |
| 7,159,217 B2 | | 1/2007 | Pulsipher et al. |
| 7,325,042 B1 | * | 1/2008 | Soscia et al. .................. 709/219 |
| 2003/0140333 A1 | | 7/2003 | Odaka et al. |
| 2004/0123268 A1 | | 6/2004 | Lundberg et al. |
| 2005/0081186 A1 | | 4/2005 | Tigani et al. |
| 2005/0234917 A1 | * | 10/2005 | Branham et al. ................. 707/10 |
| 2006/0041870 A1 | | 2/2006 | Madkour et al. |
| 2007/0050762 A1 | | 3/2007 | Chen et al. |
| 2007/0061782 A1 | | 3/2007 | Schreiner et al. |
| 2008/0025239 A1 | * | 1/2008 | Bossoli et al. ................. 370/312 |
| 2010/0037238 A1 | * | 2/2010 | Ferrazzini et al. ............. 719/317 |
| 2010/0241748 A1 | * | 9/2010 | Ansari et al. .................. 709/225 |

OTHER PUBLICATIONS

Buffenbarger, et al., "A Large-Scale Fault-Tolerant Distributed Software-Build Process", pp. 1-8.

(Continued)

*Primary Examiner* — Thomas Lee
*Assistant Examiner* — Samantha Hoang
(74) *Attorney, Agent, or Firm* — Zete Law, P.L.L.C.; MacLane C. Key

(57) ABSTRACT

Various technologies and techniques are disclosed for propagating resources during a distributed build process. Subscription of interest is registered in resources needed during a distributed build process. Build data is analyzed to determine what resources will be needed. The subscriptions of interest are stored in a data store that is accessible by all build machines participating in the distributed build process. A status of subscriptions of interest is monitored in the data store. When the status of respective subscriptions of interest indicates that a publication notice was registered for a respective resource, the respective resource is retrieved from a machine that contains the resource. When a new resource is created that is needed by other build machines, a publication notification is registered with the data store so the other build machines can determine that the new resource is now available.

18 Claims, 10 Drawing Sheets

OTHER PUBLICATIONS

Sugiyama, et al., "Distributed Development of Complex Software Systems with Object Make", pp. 1-12.

Aniorte, et al., "A Component Model to Build a Distributed Software Architecture", pp. 1-6.

* cited by examiner

SYSTEM AND METHOD FOR REGISTERING A SUBSCRIPTION OF INTEREST OF NEEDED NEW RESOURCE IN A STORE ACCESSIBLE BY A PLURALITY OF RESOURCE CREATORS AND PUSHING THE NEEDED RESOURCE THERETO BY THE CREATOR BASED UPON THE REGISTERED SUBSCRIPTION

BACKGROUND

Software applications are created using one or more software development programs. Developers write source code to implement the desired functionality of a given software application. Once the source code is written, the software application is then compiled into the executable resources that will run on an end user's computer. In large software applications, there can be hundreds or thousands of different source code files and projects that need to be compiled. For such large software applications, it is often desirable to distribute the build process across multiple build machines. These build machines each participate by performing a designated portion of the build process.

In a typical distributed software build, one build machine may build a portion of the project that another build machine needs in order to complete its part of the build. In such situations, the resource must be copied from the first build machine to the second machine over a shared network. The amount of file input/output that occurs over the shared network can impact the performance of the build process. This is because the copying of resources over the shared network is typically slower than local file access. Thus, a large amount of copying of resources over the shared network in order to perform the build can slow down the overall build process.

SUMMARY

Various technologies and techniques are disclosed for propagating resources during a distributed build process. Subscriptions of interest are registered in resources needed during a distributed build process. Build data is analyzed to determine what resources will be needed. The subscriptions of interest are stored in a data store that is accessible by all build machines participating in the distributed build process. A status of subscriptions of interest is monitored in the data store. When the status of a respective subscription of interest indicates that a publication notice was registered for a respective resource, the respective resource is retrieved from a machine that contains the resource.

In one implementation, when a new resource that is needed by other build machines is created by a respective build machine, a publication notification is registered with the data store so the other build machines can determine that the new resource is now available.

In another implementation, a system for propagating resources during a distributed build process is provided. A plurality of build machines are coupled together over a shared network. A builder program is contained on each of the plurality of build machines. The builder program is operable to perform an assigned portion of a distributed build process. A monitor program is contained on each of the plurality of build machines. The monitor program is operable to interact with a data store to register subscriptions of interest in resources needed during the distributed build process. The monitor program is also operable to determine when the subscriptions of interest in the resources can be satisfied. The monitor program is also operable to register publication notifications when new resources are created by the respective build machine so that other build machines can determine that the subscriptions of interest in the new resources can be satisfied.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques herein may be described in the general context as techniques for propagating resources between build machines participating in a distributed build process, but the technologies and techniques also serve other purposes in addition to these. In one implementation, one or more of the techniques described herein can be implemented as features within a software development program such as MICROSOFT® VISUAL STUDIO®, or from any other type of program or service that participates in a distributed build process.

Figure 1:
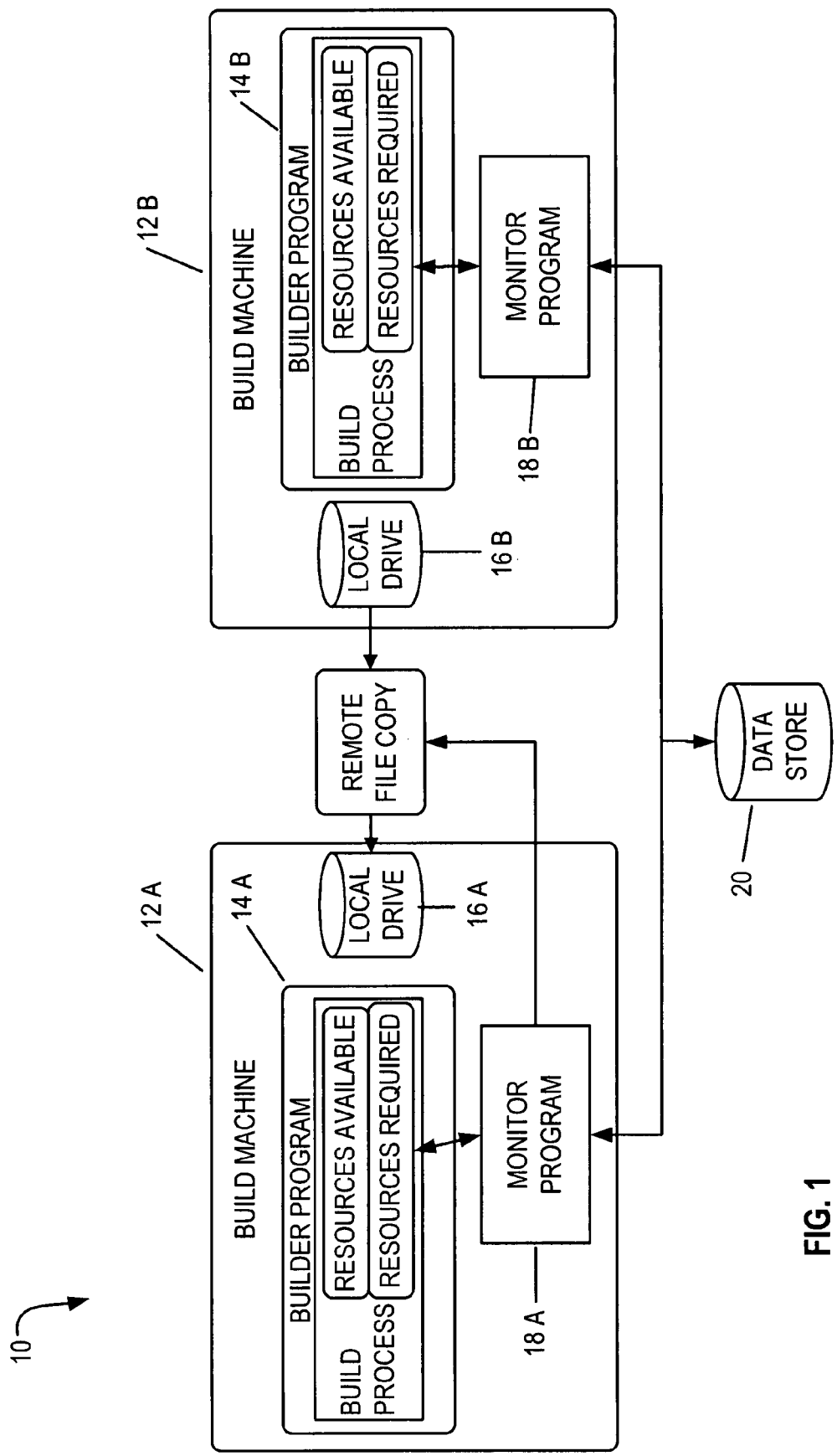
FIG. 1 is a diagrammatic view of a resource propagation system of one implementation.

FIG. 1 is a diagrammatic view of a resource propagation system 10 of one implementation. In some implementations, one or more parts of system 10 are at least partially implemented in the operating logic of computing device 100 (of FIG. 2). In one implementation, resource propagation system 10 uses a publish and subscribe model to predetermine the resources that are needed during the distributed build process, and then makes those resources available when the build happens so that multiple machines can process the build at the same time. The term "resource" as used herein is meant to include a file, registry database entry, or any other item that could be used and/or created as part of a build process. Build machines (12 A and 12 B) contain a builder program (14 A and 14 B) that is responsible for managing each build machine's respective contribution to the build process. A data store 20 contains subscriptions of interest that were registered by a respective monitor program (18 A or 18B). Each subscription of interest is registered by a respective monitor program (18 A or 18 B) to indicate that a respective resource is needed by the respective build machine (12 A or 12 B). In one implementation, a subscription of interest is generated by inserting one or more data records into the data store to designate what resource is needed. Any other suitable mechanism can be used for registering a subscription of interest to specify that a respective resource is needed by a respective build machine.

When a respective build machine (12 A or 12 B) creates a new resource on the local drive (16 A or 16 B) during the build process, the monitor program (18 A or 18 B) on the respective build machine (12 A or 12 B) registers a publication notification in the data store 20 to indicate that the new resource is available. The monitor program (18 A or 18B) on each build machine polls the data store 20 periodically to see if its subscriptions of interest can be met (i.e. if a status indicates that the resource is now available because the creating build machine has registered the publication notification). When the monitor (say 18 A, for example) determines that the subscriptions of interest can be met because the resource is now available, a remote file copy operation or other suitable operation is performed to retrieve the resource from a local drive of the other build machine (say 16 B) to the local drive (say 16 A) of the current build machine. In one implementation, the path to the resource on the local drive of the other machine is retrieved from the data store 20.

Figure 2:
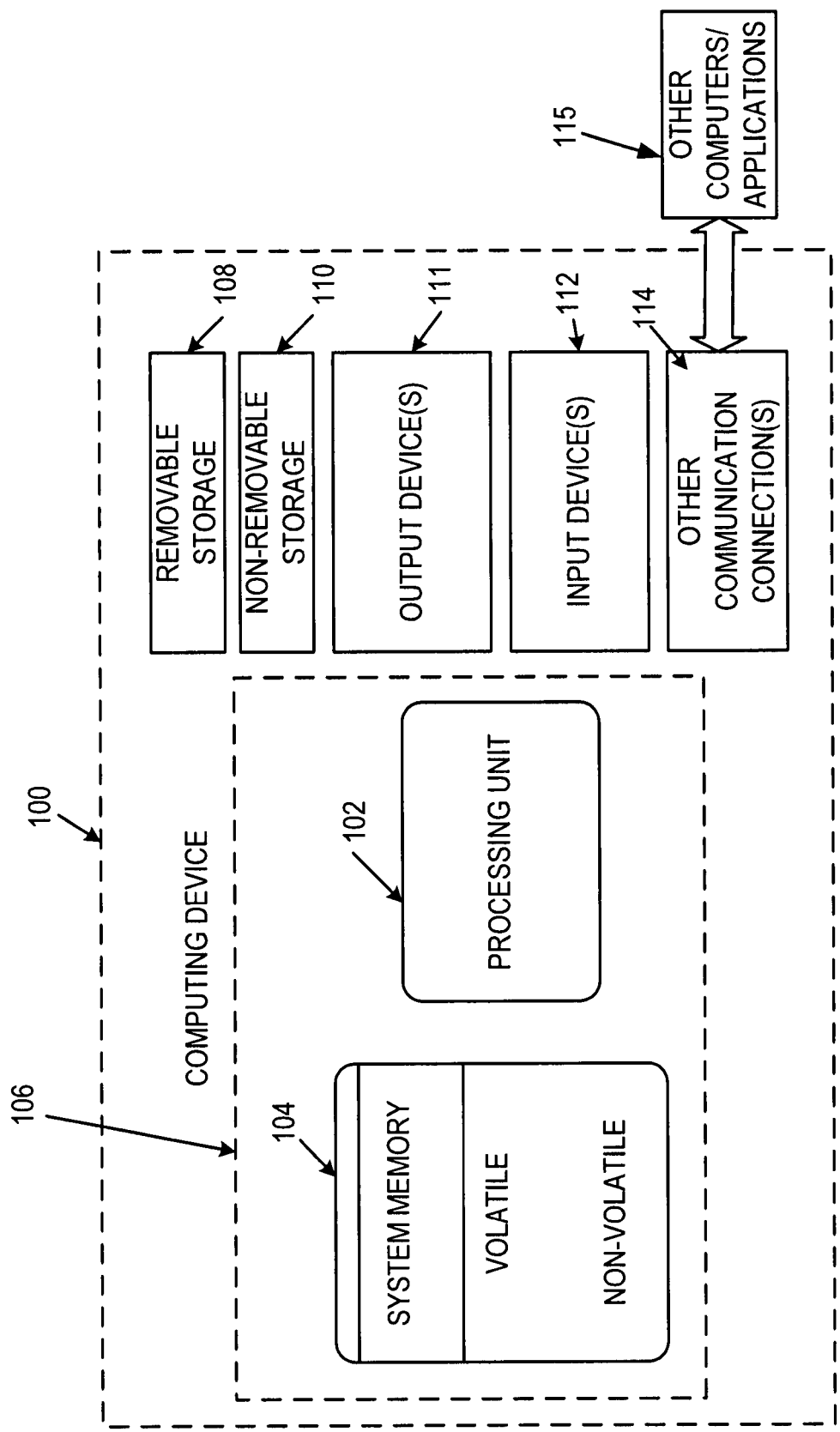
FIG. 2 is a diagrammatic view of a computer system of one implementation.

As shown in FIG. 2, an exemplary computer system to use for implementing one or more parts of the system includes a computing device, such as computing device 100. In one implementation, each build machine (12 A or 12 B on FIG. 1) can have a similar configuration as described with respect to computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 2 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 2 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here.

Figure 3:
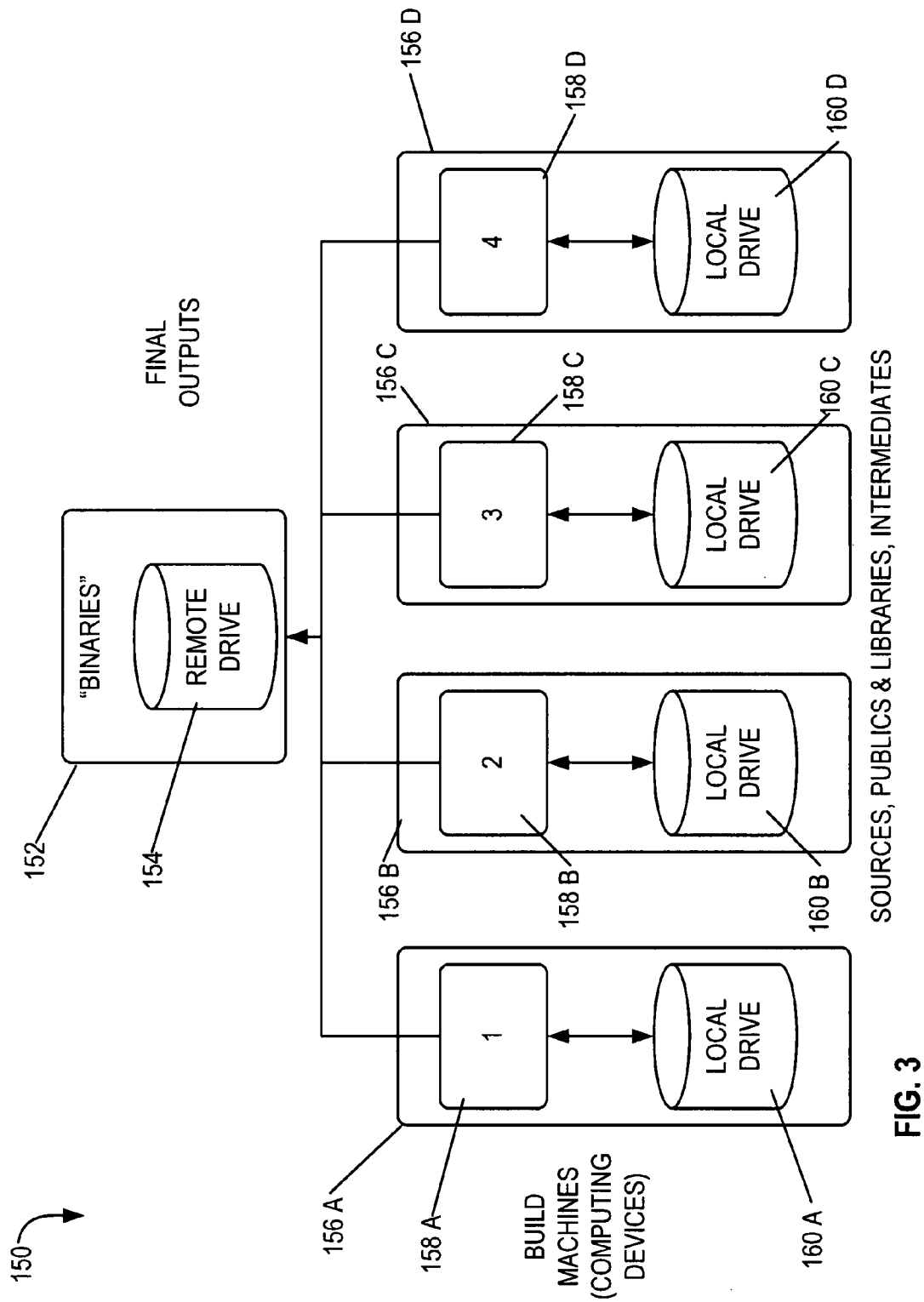
FIG. 3 is a diagrammatic view of a distributed software build across multiple build machines.

FIG. 3 is a diagrammatic view 150 of a distributed software build across multiple build machines. During the distributed build process, various build machines (156 A, 156 B, 156 C, and 156 D) contribute a respective portion of the build. For example, the build process (158 A, 158 B, 158 C, and 158 D) on each of these build machines (156 A, 156 B, 156 C, and 156 D) generates various source resources, public and library resources, and/or intermediate resources on the respective local drives (160 A, 160 B, 160 C, and 160 D). In one implementation, the final binaries 152 are then copied to a remote drive 154 when the process completes.

Figure 4:
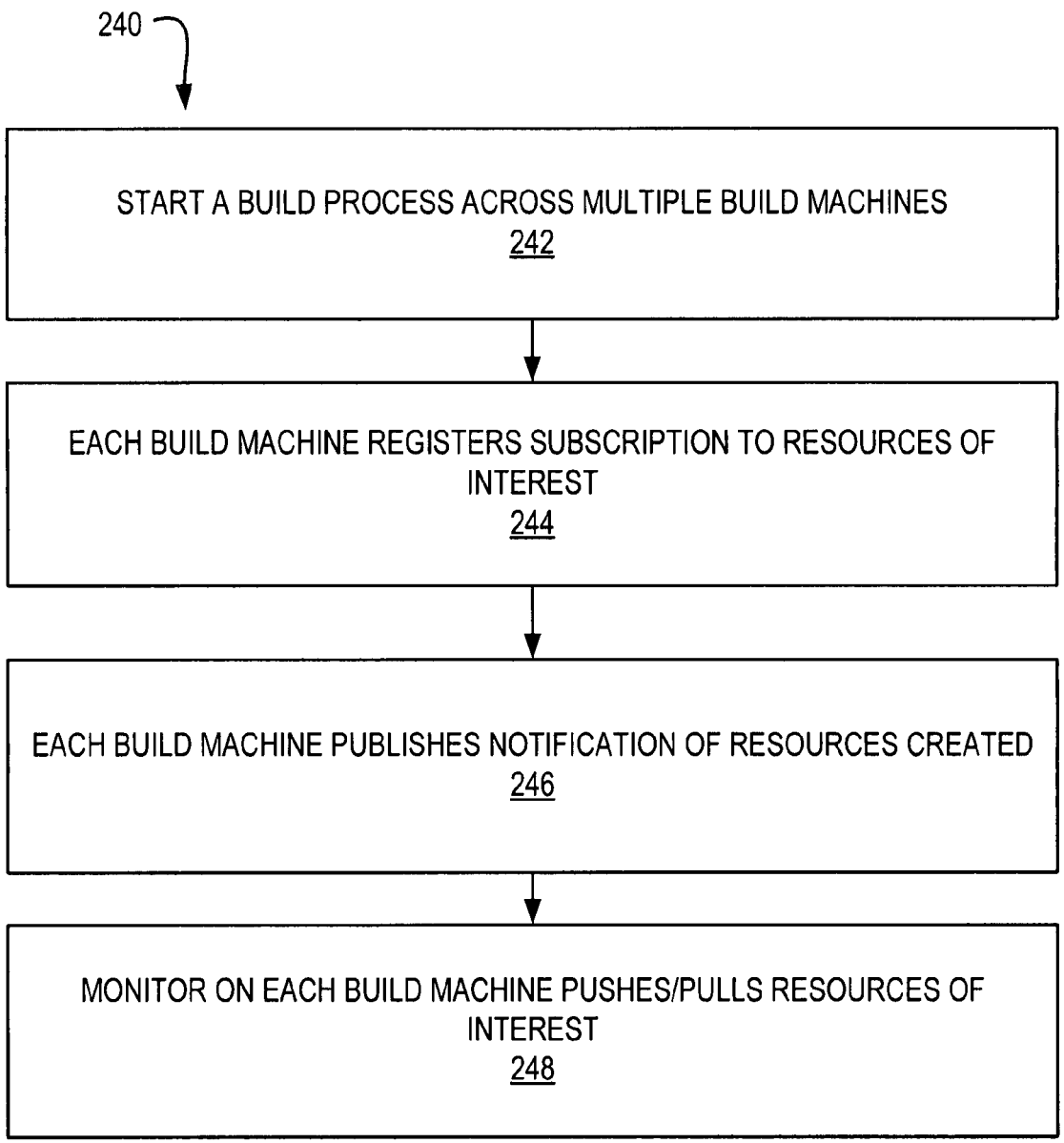
FIG. 4 is a high level process flow diagram of one implementation of the system of FIG. 1.

Turning now to FIGS. 4-10 with continued reference to FIGS. 1-3, the stages for implementing one or more implementations of resource propagation system 10 (of FIG. 1) that is used during a distributed build process (of FIG. 3) are described in further detail. In some implementations, the processes of FIG. 4-10 are at least partially implemented in the operating logic of computing device 100. FIG. 4 is a high level process flow diagram 240 that describes an overall distributed build process that uses resource propagation system 10 (of FIG. 1). Later figures describe these high level stages in further detail.

A build process is started across multiple build machines (stage 242). Each build machine registers a subscription to the resources of interest (stage 244). In other words, a respective build machine creates an entry in data store 20 (or another suitable location) to indicate that it needs a respective resource. Each build machine is able to determine what resources it needs to register an interest in by analyzing the build data (such as in a build script). In one implementation, a build script is used that contains the high level steps of how the build should work, as well as the detailed components and the resources each component contains. The subscriptions can all be registered at the beginning, and/or the subscriptions can be registered throughout the build process as the build progresses and the build machine has a better understanding of what resources are needed.

Each build machine registers publication notifications of the resources that it created (stage 246). In other words, when a respective build machine creates a new resource, that build machine creates an entry in data store 20 (or another suitable location) to indicate that the new resource is available. The monitor on each build machine then pushes/pulls resources of interest (stage 248) once those resources are determined to be available. In one implementation, build machines poll the data store 20 periodically to see if any subscriptions of interest they registered can be met. When a respective build machine determines that a respective subscription of interest can be met, that respective build machine pulls the resource from the build machine that contains the resource. This process is described in further detail in FIGS. 8 and 9. In another implementation, the build machine that created the new resource pushes that resource to the other build machines that registered an interest in the resource. This process is described in further detail in FIG. 10

Figure 5:
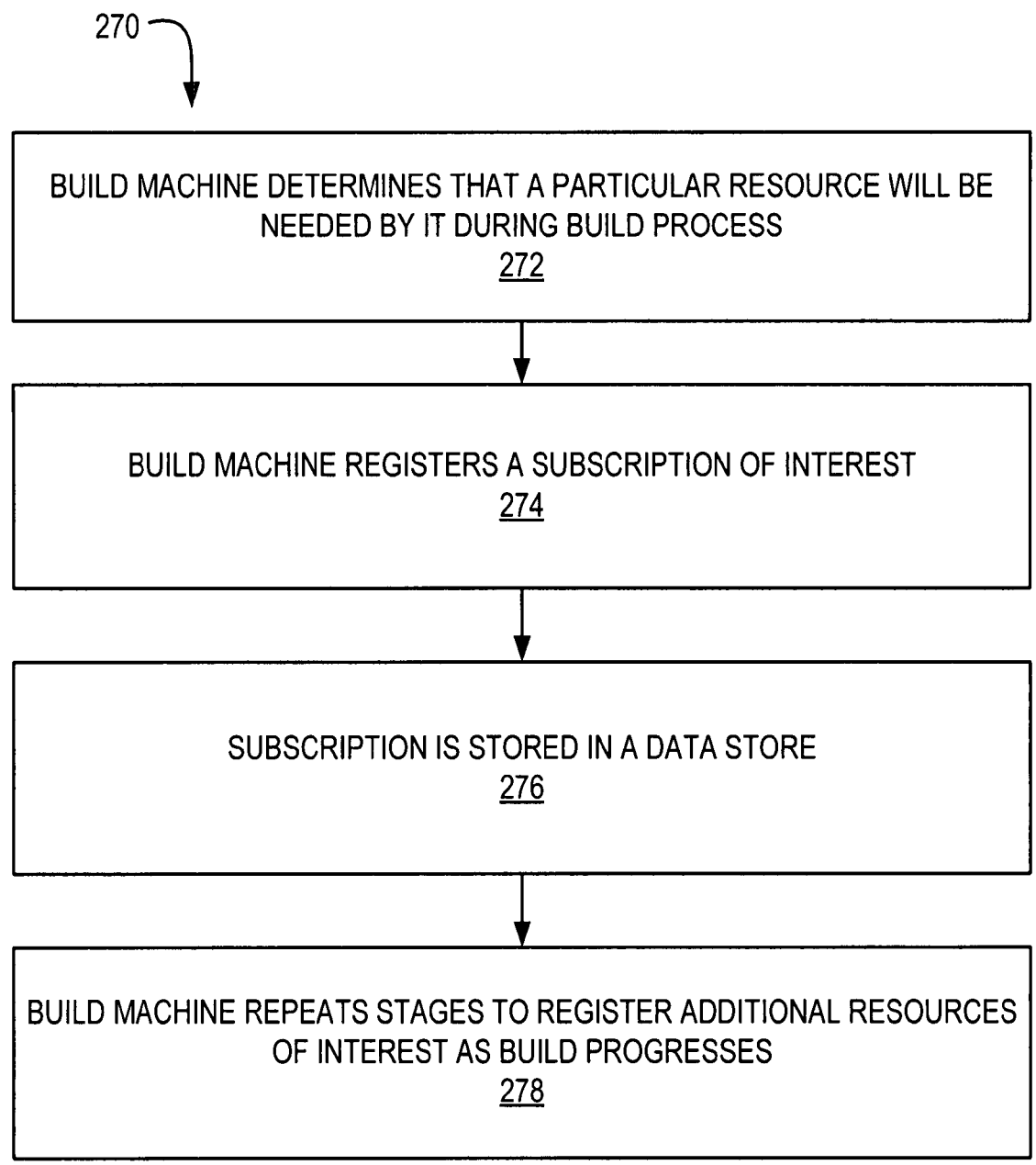
FIG. 5 is a process flow diagram for one implementation illustrating the stages involved in registering a subscription for resources of interest.

Turning now to FIG. 5, a process flow diagram 270 is shown that illustrates one implementation of the more detailed stages involved in registering a subscription for resources of interest. A respective build machine 270 determines that a particular resource will be needed by it during the build process (stage 272). As noted previously, one way of determining that the particular resource will be needed during the build process by this respective build machine is by analyzing the build data (such as in a build script). The build machine registers a subscription of interest in that particular resource (stage 274). The subscription is stored in data store 20 (stage 276). The build machine repeats the stages to register additional resources of interest as the build progresses (stage 278) and/or at the beginning of the build process.

Figure 6:
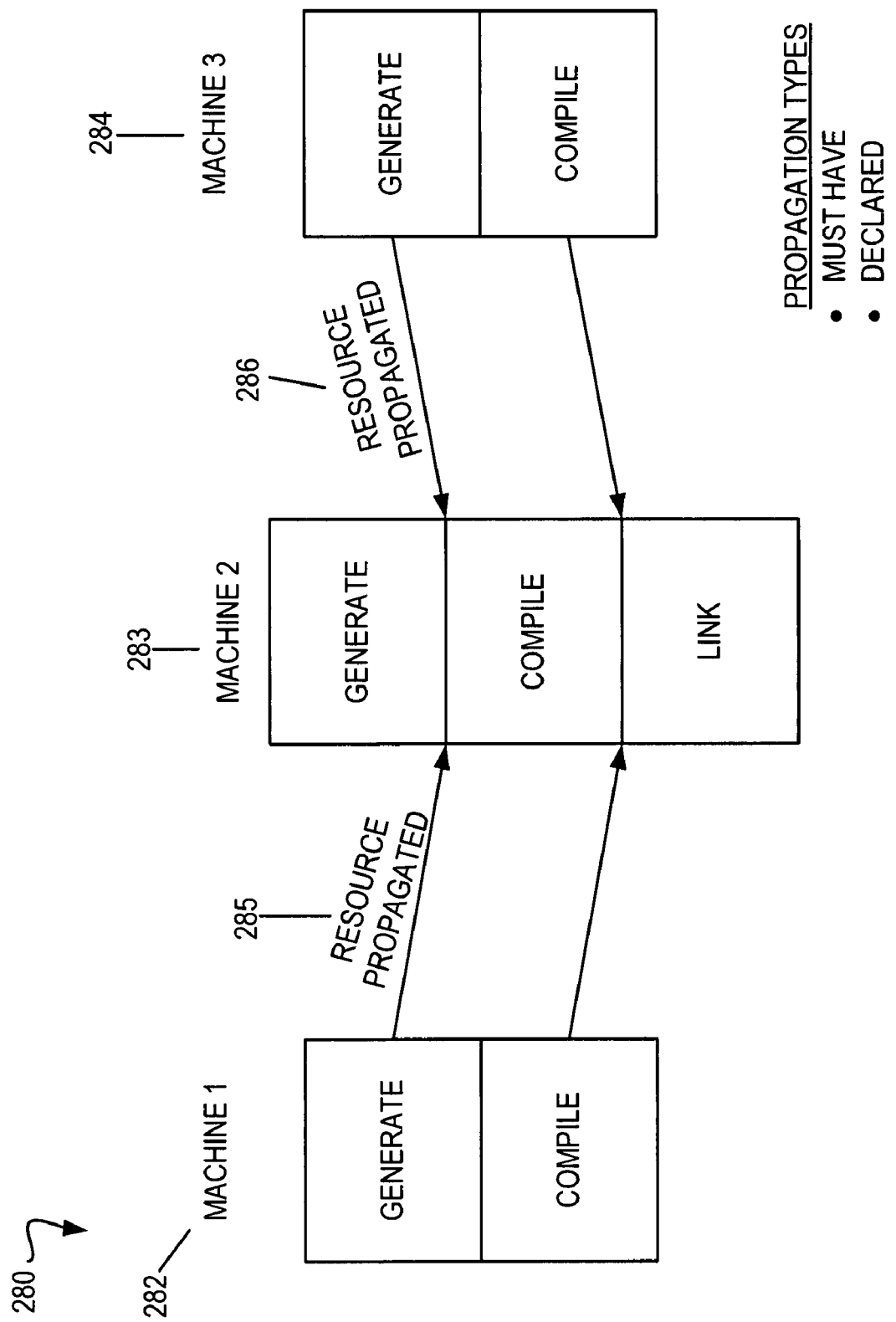
FIG. 6 is a diagrammatic view of one implementation illustrating the propagation of resources between build machines.

FIG. 6 is a diagrammatic view 280 of one implementation illustrating the propagation of resources between build machines (282, 283, and 284). In the example shown, three build machines (282, 283, and 284) have resources that are needed by the others. After generation of a resource on machine 1 (282), that resource is propagated to machine 2 (283) for use during that machine's compile phase. Similarly, a resource on machine 3 (284) is propagated to machine 2 (283) for use in its compile phase. This is just an illustrative example of how resources from one machine can be needed by and propagated to other build machines participating in the distributed build process. Numerous other variations are also possible.

In one implementation, there can be two types of propagations. Some propagations can be "must have" propagations which means that all build machines will need the resource. When registering subscriptions for such resources that are needed by all build machines, wild cards or other indicators can be used so that all build machines will obtain the resource when it is available. Another type of propagation is a "declared" propagation. This just means that each machine is responsible for registering its own resources of interest, even if the same resource ends up being used by multiple build machines. The discussion will now turn to FIG. 7-10 to describe more details about this propagation process that uses a publish and subscribe model.

Figure 7:
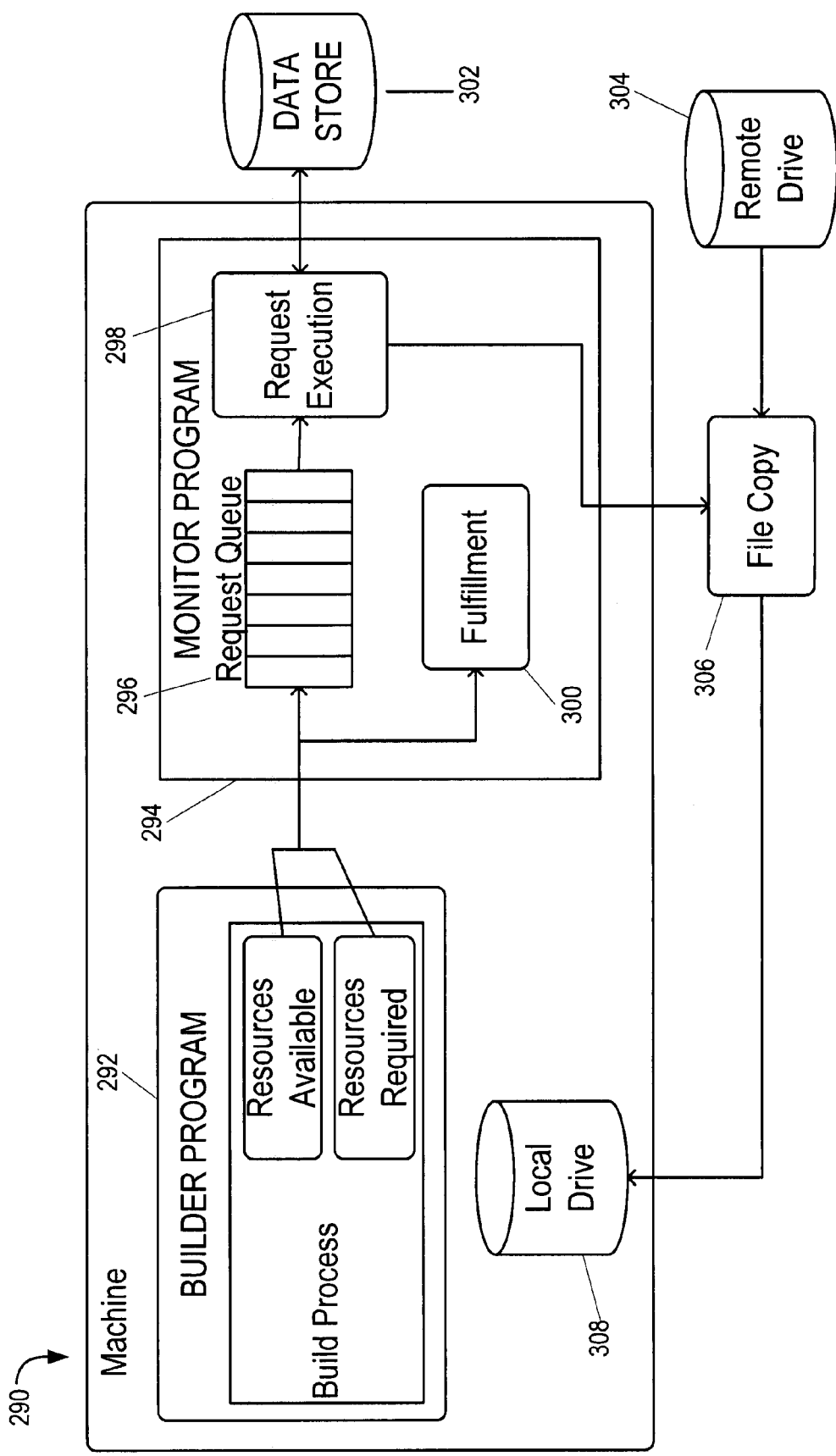
FIG. 7 is a diagrammatic view of a builder program and a build monitor program of one implementation.

FIG. 7 is a diagrammatic view 290 of a builder program 292 and a build monitor program 294 of one implementation. In the example shown, builder program 292 is responsible for managing the build process, and is aware of the resources that are available and the resources that are required for its share of the build process. Builder program 292 communicates with the monitor program 294 to send the new resources that it just made available as well as the resources that it requires to the request queue 296. The request queue 296 interacts with the fulfillment process 300 and the request execution process 298. The fulfillment process 300 is responsible for the polling of the data store 302 to determine if any new resources are ready to be propagated to this build machine. In one implementation, the fulfillment process 300 does this by inserting a "propagate now" request into the request queue 296, which will be executed by the request execution process 298. In one implementation, the request execution process 298 takes work items (either fulfillment requests, new subscription or new publication requests) and acts on them. Fulfillment means any files that are now published for this machine are propagated. Subscription means that this machine needs particular resources. Publication means that this machine has resources available for others.

For the sake of clarity, a more simplified example will now be described. When a new resource has been created or otherwise made available by the build machine 290, a publication notification is registered with the data store 302 so that other machines can obtain the resource if needed. As another example, when the builder program 292 determines that a particular resource will be needed in a future step of the build, a subscription notification is registered with the data store 302 to indicate that the build machine 290 has an interest in that resource.

In one implementation, when a polling of the data store 302 reveals that the resource is now available, a remote file copy 306 or other suitable operation is initiated by the build machine 290 that registered an interest in the resource to copy the resource to local drive 308. This implementation is described in further detail in FIG. 9. In another implementation, a separate build machine that created the new resource actually pushes the resource to the local drive 308 of build machine 290 by using a remote file copy 306 or another suitable operation because build machine 290 had registered an interest in the resource. This implementation is described in further detail in FIG. 10.

Figure 8:
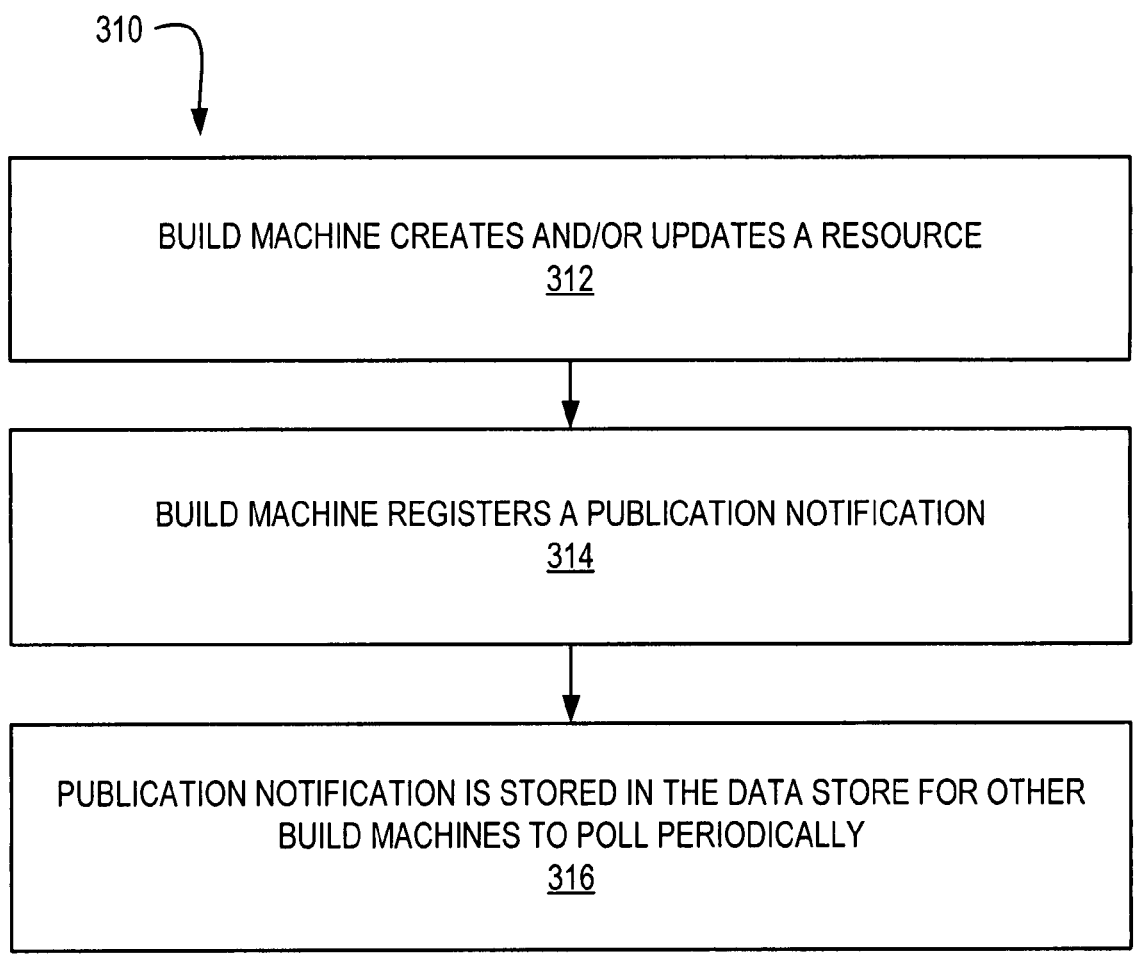
FIG. 8 is a process flow diagram for one implementation that illustrates the stages involved in publishing resource creation/updates to the data store to indicate the resources are available to subscriber build machines.
Figure 9:
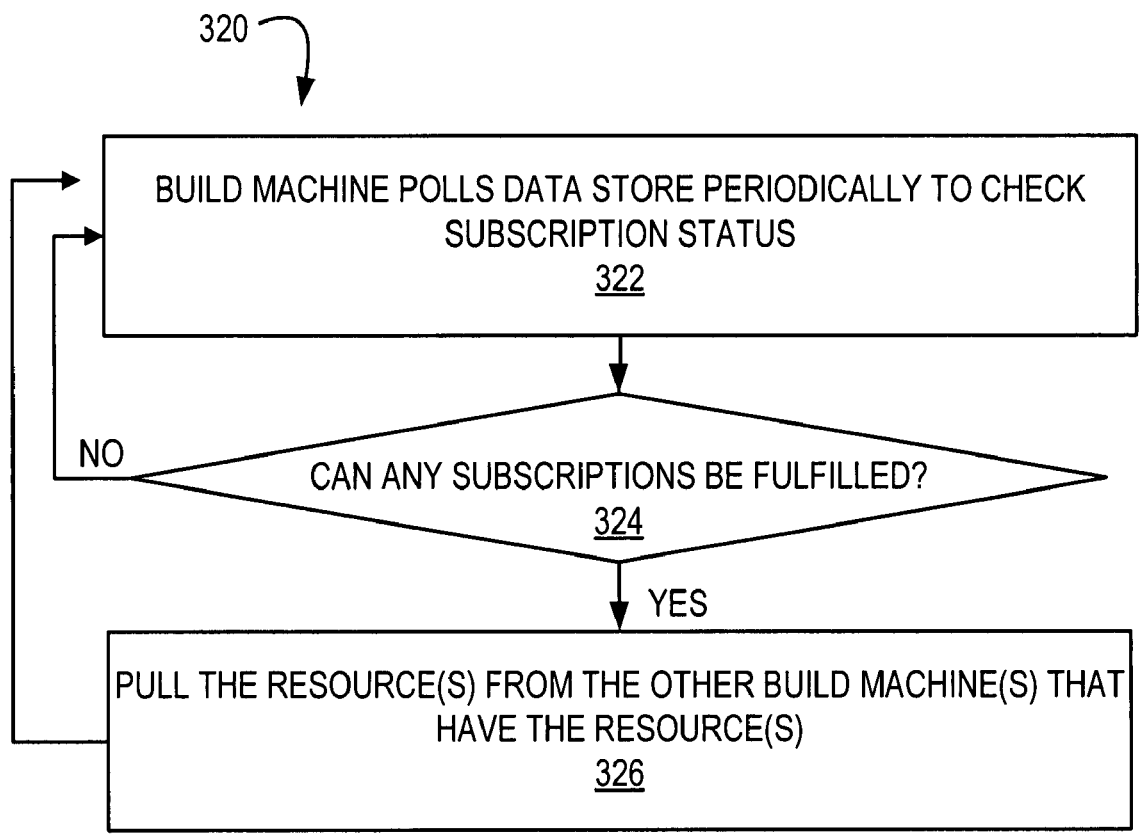
FIG. 9 is a process flow diagram for one implementation that illustrates the stages involved in polling the data store periodically to see if subscription(s) can be fulfilled and then pulling available resources.
Figure 10:
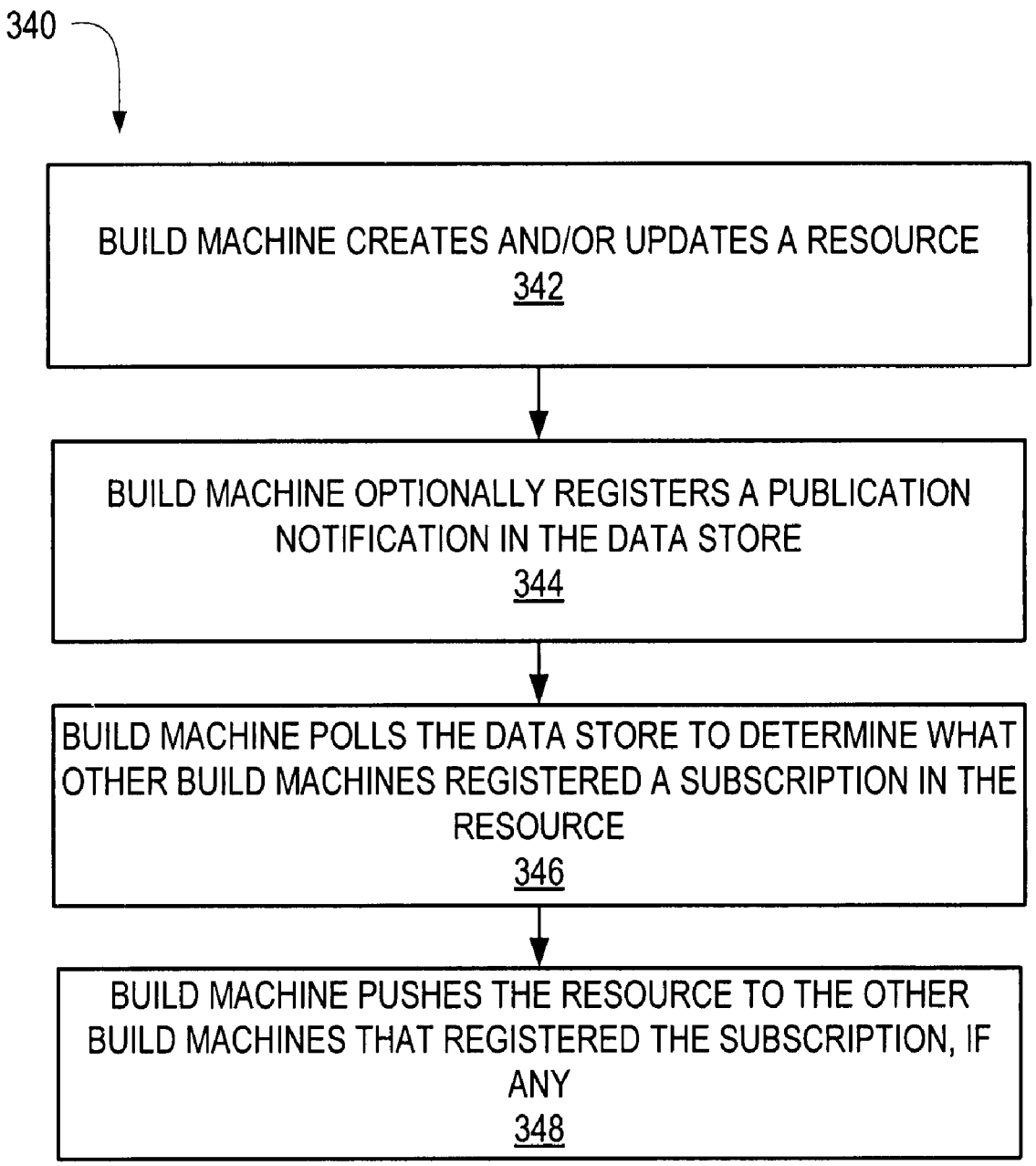
FIG. 10 is another implementation illustrating the stages involved in pushing resources to build machines that registered a subscription to the resource.

FIG. 8 is a process flow diagram 310 that describes the publication process introduced in FIG. 7 in a slightly different way for the sake of illustration. FIG. 7 illustrates one implementation of the stages involved in publishing resource creation/updates to the data store to indicate the resources are available to subscriber build machines. At some point after a respective build machine creates and/or updates a resource (stage 312), the build machine registers a publication notification (stage 314) to indicate that the resource is now available. The point the publication is registered can be immediately after the resource is created, or at a next point in time that the monitor program 294 determines that the new resource was created. The publication notification is stored in the data store 20 for other build machines to poll periodically (stage 316). Turning now to FIGS. 9 and 10, two different implementations are described to illustrate how the resources can be propagated to the build machines.

Beginning with FIG. 9, a process flow diagram 320 is shown that illustrates one implementation of the stages involved in polling the data store periodically to see if subscription(s) can be fulfilled and then pulling the available resources. The build machine polls the data store periodically to check the subscription status (stage 322) of all subscriptions for which it registered an interest. If any of the subscriptions can be fulfilled (decision point 324), then the resources are pulled from the other build machine(s) that have the resource(s) (stage 326) using a remote file copy operation or another suitable operation for retrieving the resource. The polling then continues to see if other resources are available. If none of the subscriptions can be fulfilled (decision point 324), then the polling continues (stage 322).

FIG. 10 is a process flow diagram 340 that illustrates another implementation illustrating the stages involved in pushing resources to build machines that registered a subscription to indicate an interest in the resource. A respective build machine creates and/or updates a resource (stage 342). The build machine optionally registers a publication notification in the data store (stage 344) to allow other build machines to see that it has the resource available. The build machine polls the data store to determine what other build machines have already registered a subscription to indicate an interest in the resource (stage 346). The build machine then pushes the resource to the other build machines that registered the subscription, if any (stage 348).

In yet another implementation, the data store could have a mechanism that directly notifies the monitor on a given build machine (or another suitable machine or monitor) to indicate that publications are available. This could be instead of, or in addition to the polling of the data store that is described in FIG. 9 and/or the pushing of files described as described in FIG. 10.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A computer-storage medium storing computer-executable instructions for causing a computer to perform steps comprising:
registering a subscription of interest in a resource needed by a first build machine during a distributed build process by causing the subscription of interest to be stored in a data store;
monitoring a status of the subscription of interest in the data store for the resource needed by the first build machine;
when the status of the subscription of interest indicates that a publication notice was registered for the resource needed by the first build machine, retrieving the resource from a second build machine that contains the resource; and
upon creating a new resource by the first build machine that is needed the second build machine participating in the build process, pushing the new resource from the first build machine to the second build machine, the second build machine having registered a corresponding subscription of interest for the new resource in the data store.

2. The computer-storage medium of claim 1, further having computer-executable instructions for causing a computer to perform steps comprising:
repeating the registering, causing, monitoring, and retrieving steps during the distributed build process for additional resources.

3. The computer-storage medium of claim 1, wherein prior to retrieving the resource from the second build machine that contains the resource, a location of the resource is retrieved from the data store.

4. The computer-storage medium of claim 1, wherein the resource is retrieved from the second build machine that contains the resource by using a remote file copy operation.

5. The computer-storage medium of claim 1, further having computer-executable instructions for causing a computer to perform steps comprising:
prior to registering the subscription of interest in the resource by the first build machine, analyzing build data to determine that the resource will be needed during the distributed build process.

6. The computer-storage medium of claim 1, wherein the data store is accessed by each of a plurality of build machines that are participating in the distributed build process to register respective subscriptions of interest and to check respective statuses of the respective subscriptions of interest.

7. The computer-storage medium of claim 1, further having computer-executable instructions for causing a computer to perform steps comprising:
registering a publication notification by the first build machine upon creating the new resource that is needed by the second build machine during the distributed build process.

8. The computer-storage medium of claim 7, wherein the registering is performed by causing the publication notification to be stored in the data store.

9. The computer-storage medium of claim 8, wherein by causing the publication notification to be stored in the data store, the second build machine can poll the data store periodically to determine that the new resource is now available.

10. A method for registering subscriptions of interest during a distributed build process comprising the steps of:
analyzing build data to determine that a resource will be needed by a first build machine during a distributed build process;
registering a subscription of interest in the resource needed by the first build machine by storing the subscription of interest in a data store that is accessible by a plurality of build machines participating in the distributed build process; and
upon creating a new resource by the first build machine that is needed by one or more other build machines of the plurality of build machines participating in the build process, accessing the data store to identify the one or more other build machines that registered an interest in the new resource, and then pushing the new resource from the first build machine to the identified one or more other build machines.

11. The method of claim 10, wherein when it is determined that the resource will be needed during the distributed build process by the plurality of build machines participating in the distributed build process, then registering the subscription of interest for the plurality of build machines.

12. The method of claim 11, wherein the subscription of interest is registered for the plurality of build machines when the subscription of interest applies to the plurality of build machines.

13. The method of claim 10, further comprising:
registering a publication notification by the first build machine upon creating the new resource that is needed by the one or more other build machines during the distributed build process.

14. The method of claim 10, wherein the build data is contained in at least one build script.

15. The method of claim 14, wherein the build script contains details about the resources that are used during the build process.

16. The method of claim 10, wherein the analyzing and registering steps are repeated as the distributed build progresses to register additional subscriptions of interest in additional resources.

17. The method of claim 10, wherein the subscription of interest is registered throughout the build process as the build progresses.

18. A system for propagating resources during a distributed build process comprising:
a plurality of build machines coupled together over a shared network, each of the plurality of build machines contributing a respective portion of the distributed build process;
a builder program on each of the plurality of build machines, each builder program performing an assigned portion of the distributed build process and sending new resources created by a respective builder program on a corresponding build machine to a request queue of a monitor program on the corresponding build machine, each of the plurality of build machines comprising a local drive storing the new resources created during the assigned portion of the distributed build process, wherein:
the monitor program interacting with a data store to register subscriptions of interest in resources needed by the respective builder program during the distributed build process, determining when the subscriptions of interest in the resources can be satisfied, and registering publication notifications of the new resources created by the respective builder program indicating to other build machines that subscriptions of interest in the new resources can be satisfied, and the request queue interacting with a fulfillment process of the monitor program, the fulfillment process polling the data store to determine if new resources created by the other build machines are ready to be propagated to the corresponding build machine; and each of the plurality of build machines performing a remote file copy operation to obtain a respective resource from the local drive of another of the build machines when the other of the build machines has registered a respective publication notification to indicate the respective resource is available.

* * * * *

UNITED STATES PATENT AND TRADEMARK OFFICE
CERTIFICATE OF CORRECTION

| | | |
|---|---|---|
| PATENT NO. | : 8,161,488 B2 | Page 1 of 1 |
| APPLICATION NO. | : 11/977122 | |
| DATED | : April 17, 2012 | |
| INVENTOR(S) | : Kieran P. Mockford | |

It is certified that error appears in the above-identified patent and that said Letters Patent is hereby corrected as shown below:

In column 7, line 27, in Claim 1, after "needed" insert -- by --.

Signed and Sealed this
Ninth Day of October, 2012

David J. Kappos
*Director of the United States Patent and Trademark Office*